United States Patent
Tasaka

(10) Patent No.: US 11,498,218 B2
(45) Date of Patent: Nov. 15, 2022

(54) ROBOT

(71) Applicant: Seiko Epson Corporation, Tokyo (JP)

(72) Inventor: Hironori Tasaka, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 250 days.

(21) Appl. No.: 16/887,112

(22) Filed: May 29, 2020

(65) Prior Publication Data
US 2020/0376673 A1 Dec. 3, 2020

(30) Foreign Application Priority Data
May 31, 2019 (JP) .............................. JP2019-102214

(51) Int. Cl.
*B25J 9/16* (2006.01)
(52) U.S. Cl.
CPC .................... *B25J 9/1694* (2013.01)
(58) Field of Classification Search
CPC ........ B25J 9/1694; B25J 13/085; B25J 15/10; B25J 18/02; B25J 19/023; B25J 9/1612; B25J 17/0233; B25J 15/0408; B25J 15/04; B25J 9/08; B25J 19/021; B25J 19/022; B25J 9/1602; G05B 2219/40584; G05B 2219/40609; G05B 2219/39578; G05B 2219/40296; G05B 2219/40304; G05B 2219/34205; G05B 2219/35029; G05B 2219/50158; G06T 1/0014
See application file for complete search history.

(56) References Cited

U.S. PATENT DOCUMENTS

| | | | |
|---|---|---|---|
| 10,773,382 B2 * | 9/2020 | Bai | B25J 9/1612 |
| 2005/0096792 A1 * | 5/2005 | Watanabe | B25J 19/023 |
| | | | 700/245 |
| 2017/0363490 A1 * | 12/2017 | Matsuzawa | G01L 5/16 |
| 2018/0290307 A1 | 10/2018 | Watanabe | |
| 2021/0229290 A1 * | 7/2021 | Kume | B25J 19/023 |
| 2022/0001543 A1 * | 1/2022 | Morimoto | B25J 13/08 |
| 2022/0040866 A1 * | 2/2022 | Nitz | G05B 19/423 |

FOREIGN PATENT DOCUMENTS

| JP | 2003-117867 A | 4/2003 |
|---|---|---|
| JP | 2018-176334 A | 11/2018 |

* cited by examiner

*Primary Examiner* — Abby Y Lin
*Assistant Examiner* — Esvinder Singh
(74) *Attorney, Agent, or Firm* — Yu Gang

(57) ABSTRACT

A robot includes a first arm having a hole and extending along a first axis, a second arm coupled to the first arm, and rotating around a second axis crossing the first axis, a sensor configured to detect a target, and an attachment member provided to the second arm, and configured to support the sensor, wherein the attachment member is inserted through the hole, and extending along the second axis. Further, the sensor may be located outside an outer surface of the first arm.

8 Claims, 8 Drawing Sheets

ROBOT

The present application is based on, and claims priority from JP Application Serial Number 2019-102214, filed May 31, 2019, the disclosure of which is hereby incorporated by reference herein in its entirety.

BACKGROUND

1. Technical Field

The present disclosure relates to a robot.

2. Related Art

As shown in, for example, JP-A-2003-117867 (Document 1), there has been known a robot having a robot arm for performing an operation of gripping an object or attaching a component, and a camera installed in the robot arm. Such a robot is capable of performing a variety of operations based on an image of the object taken by the camera.

Further, in the robot described in Document 1, the robot arm has an upper arm part and a wrist part rotatably coupled to the upper arm part. Further, the camera is fixed to the upper arm part.

However, in the robot described in Document 1, when the wrist part rotates with respect to the upper arm part, the wrist part runs off the imaging field of the camera in some cases. In other words, depending on the posture of the wrist part, an end effector on the tip side of the wrist part, and a work gripped by the end effector run off the imaging field in some cases.

SUMMARY

A robot according to the present application example includes a first arm having a hole and extending along a first axis, a second arm coupled to the first arm, and rotating around a second axis crossing the first axis, a sensor configured to detect a target, and an attachment member provided to the second arm, and configured to support the sensor, wherein the attachment member is inserted through the hole, and extending along the second axis.

DESCRIPTION OF EXEMPLARY EMBODIMENTS

The robot according to the present disclosure will hereinafter be described in detail based on some preferred embodiments shown in the accompanying drawings.

First Embodiment

Figure 1:
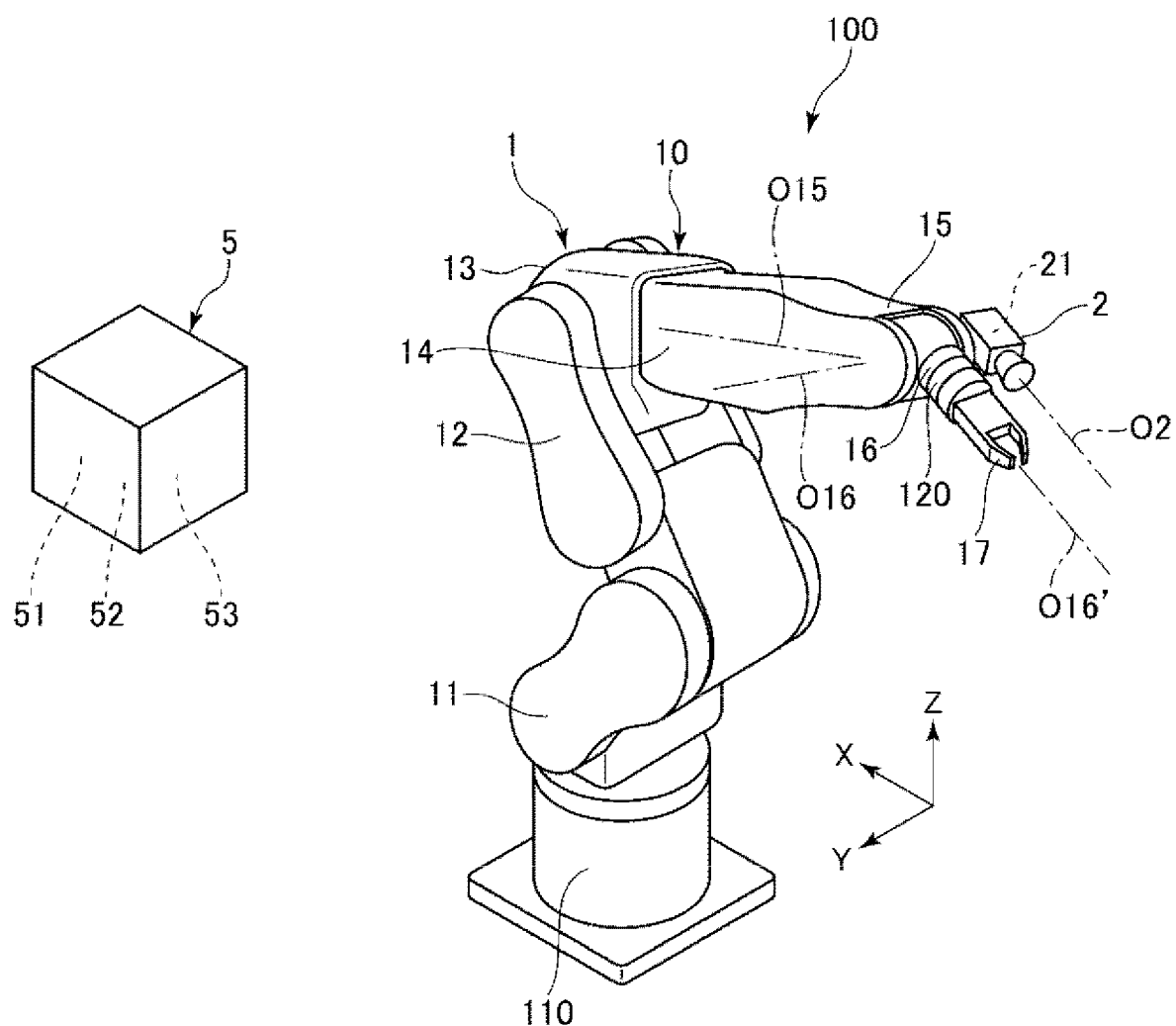
FIG. 1 is a diagram showing a robotic system provided with a robot according to a first embodiment.
Figure 2:
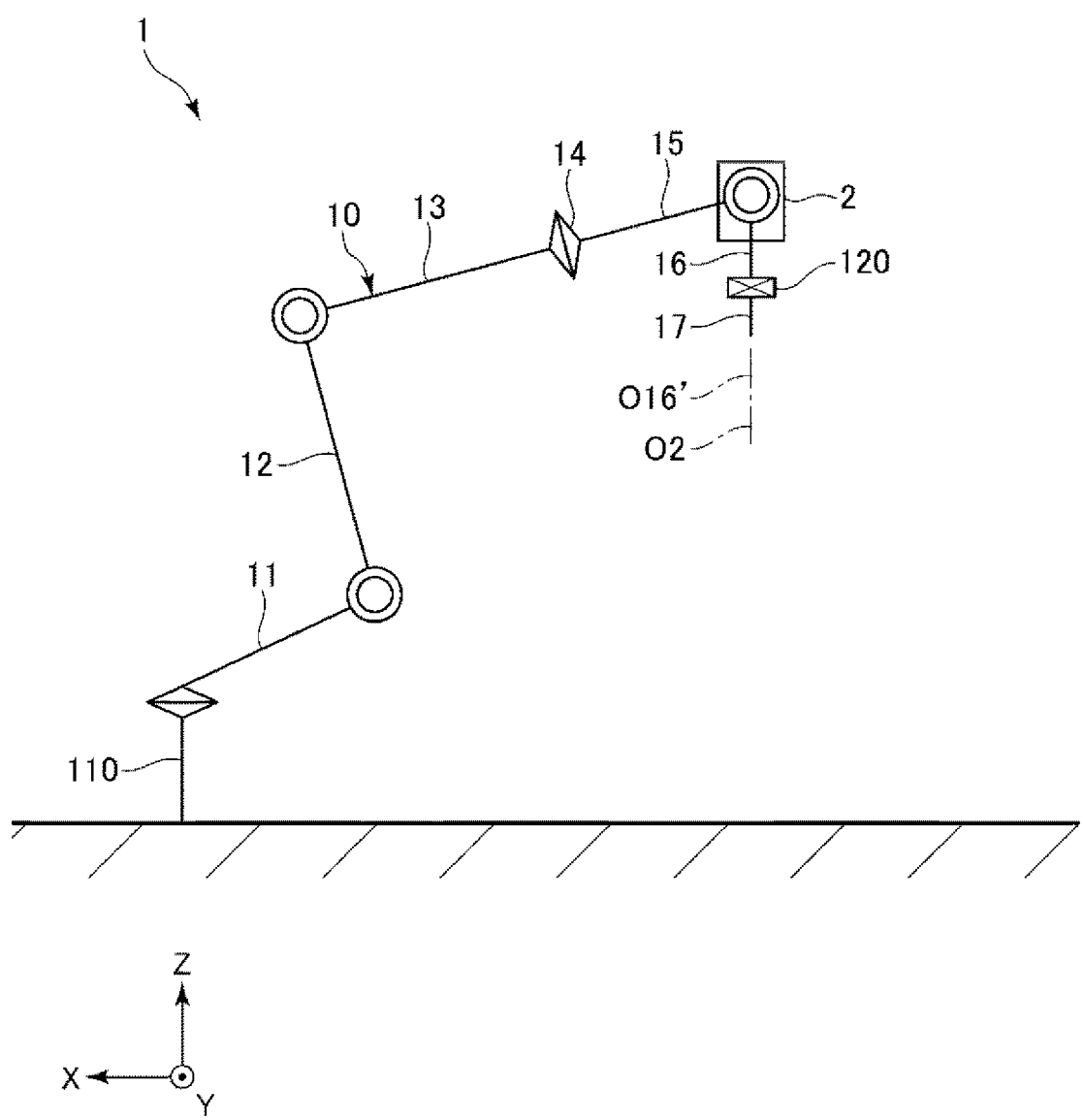
FIG. 2 is a schematic diagram of the robot shown in FIG. 1.
Figure 3:
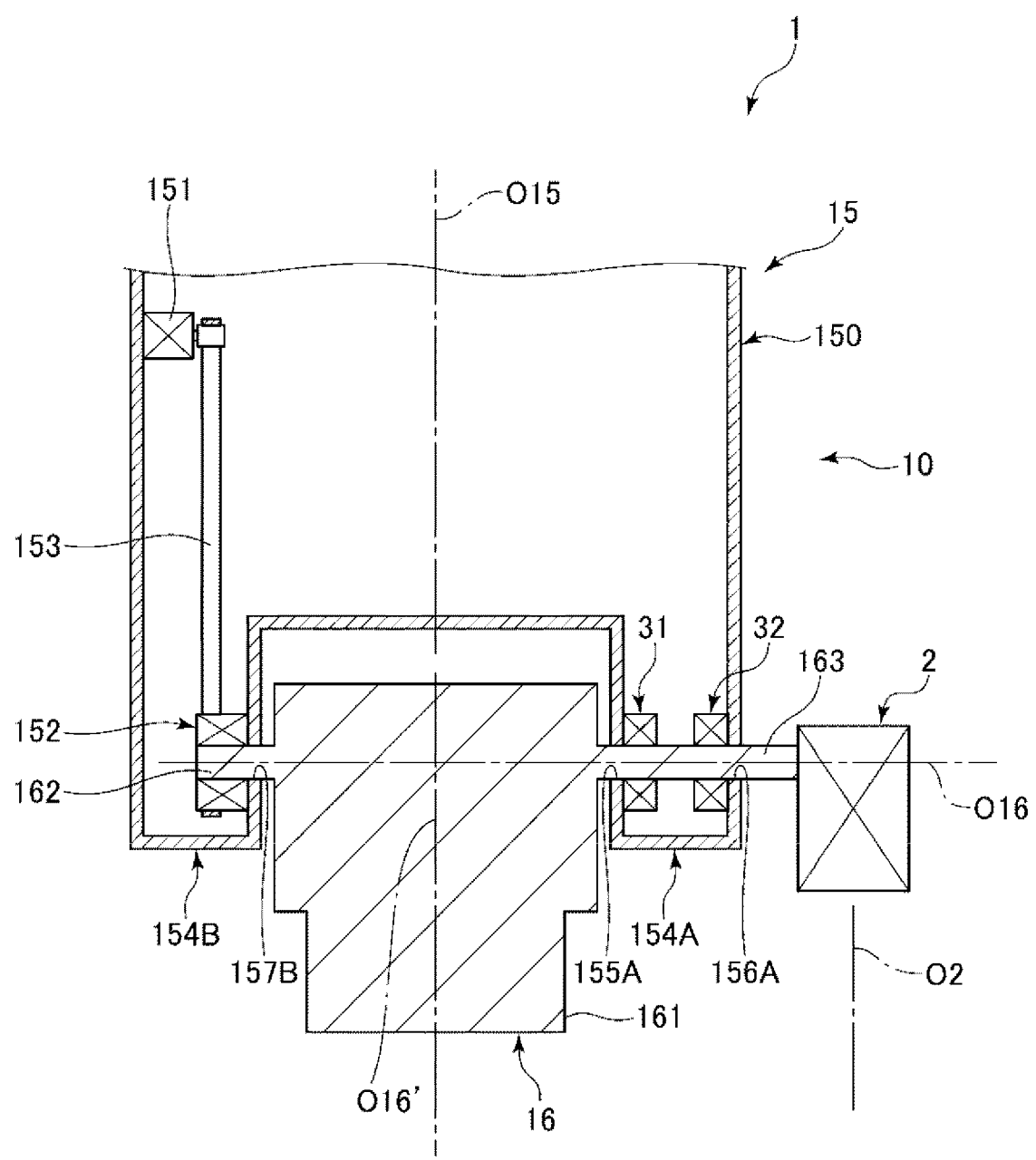
FIG. 3 is a vertical cross-sectional view showing a coupling section between a first arm and a second arm.

FIG. 1 is a diagram showing a robotic system provided with a robot according to a first embodiment. FIG. 2 is a schematic diagram of the robot shown in FIG. 1. FIG. 3 is a vertical cross-sectional view showing a coupling section between a first arm and a second arm.

In the present specification, the term "horizontal" includes the case of being tilted within ±10° with respect to a horizontal plane. Similarly, the term "vertical" includes the case of being tilted within ±10° with respect to a vertical plane. Further, the term "parallel" includes not only when two lines (including an axis) or planes are completely parallel to each other, but also when those are tilted within ±10° from each other. Further, the term "perpendicular" not only includes when two lines (including an axis) or planes cross each other at an angle of 90°, but also includes when those are tilted within ±10° with respect to 90°. Further, in the present specification, the word "couple" includes the case of being directly coupled, and the case of being indirectly coupled via an arbitrary member.

The robotic system 100 shown in FIG. 1 can be used in an operation such as holding, conveying, and assembling of a work such as an electronic component. The robotic system 100 includes a robot 1 and a control device 5 for controlling drive of the robot 1.

As shown in FIG. 1 and FIG. 2, the robot 1 is a so-called six-axis vertical articulated robot, and has a base 110 and a robot arm 10 coupled to an upper part of the base 110. It should be noted that in the following description, the base 110 side of the robot arm 10 is also referred to as a base end side, and an opposite side to the base 110 of the robot arm 10 is also referred to as a tip side. It should be noted that the illustration of a force detection section 120 is omitted in FIG. 2.

The base 110 is a part for attaching the robot 1 to an arbitrary installation place. In the present embodiment, the base 110 is installed in the installation place such as a floor. It should be noted that the installation place of the base 110 is not limited to the installation place such as a floor, but can also be, for example, a wall, a ceiling, or an upper surface of a movable wagon.

As shown in FIG. 1 and FIG. 2, the robot arm 10 includes a plurality of arms, namely an arm 11, an arm 12, an arm 13, an arm 14, an arm 15, and an arm 16. These arms 11 through 16 are coupled to one another in this order from the base end side toward the tip side. The arms 11 through 16 are made rotatable with respect to adjacent one of the arms 11 through 16 or the base 110. Here, as shown in FIG. 1, the arm 16 is shaped like a disk or a short circular cylinder, and is made rotatable around a rotational axis O16 with respect to the arm 15. Further, in the present embodiment, the center of the tip surface of the arm 16, namely a tool center point, is set as a control point.

Further, as shown in FIG. 1, to the tip of the robot arm 10, it is possible to detachably attach a hand 17 as an end effector for gripping, for example, a work or a tool. The hand 17 has a configuration of gripping an object with two fingers in the illustrated configuration. It should be noted that the configuration of the hand 17 is not limited thereto, but can also be a configuration having three or more fingers, or a suction type configuration. Further, on the tip of the robot arm 10, it is also possible to mount a tool or the like besides the hand 17. Further, it is also possible to use them by arbitrarily replacing them with each other.

Further, as shown in FIG. 1, between the arm 16 and the hand 17, the force detection section 120 is detachably attached to the arm 16 and the hand 17. The force detection section 120 detects a force applied to the hand 17. The force detection section 120 is formed of, for example, a six-axis kinesthetic sensor or a three-axis kinesthetic sensor. Further, the force detection section 120 outputs force detection information thus detected to the control device 5.

Figure 4:
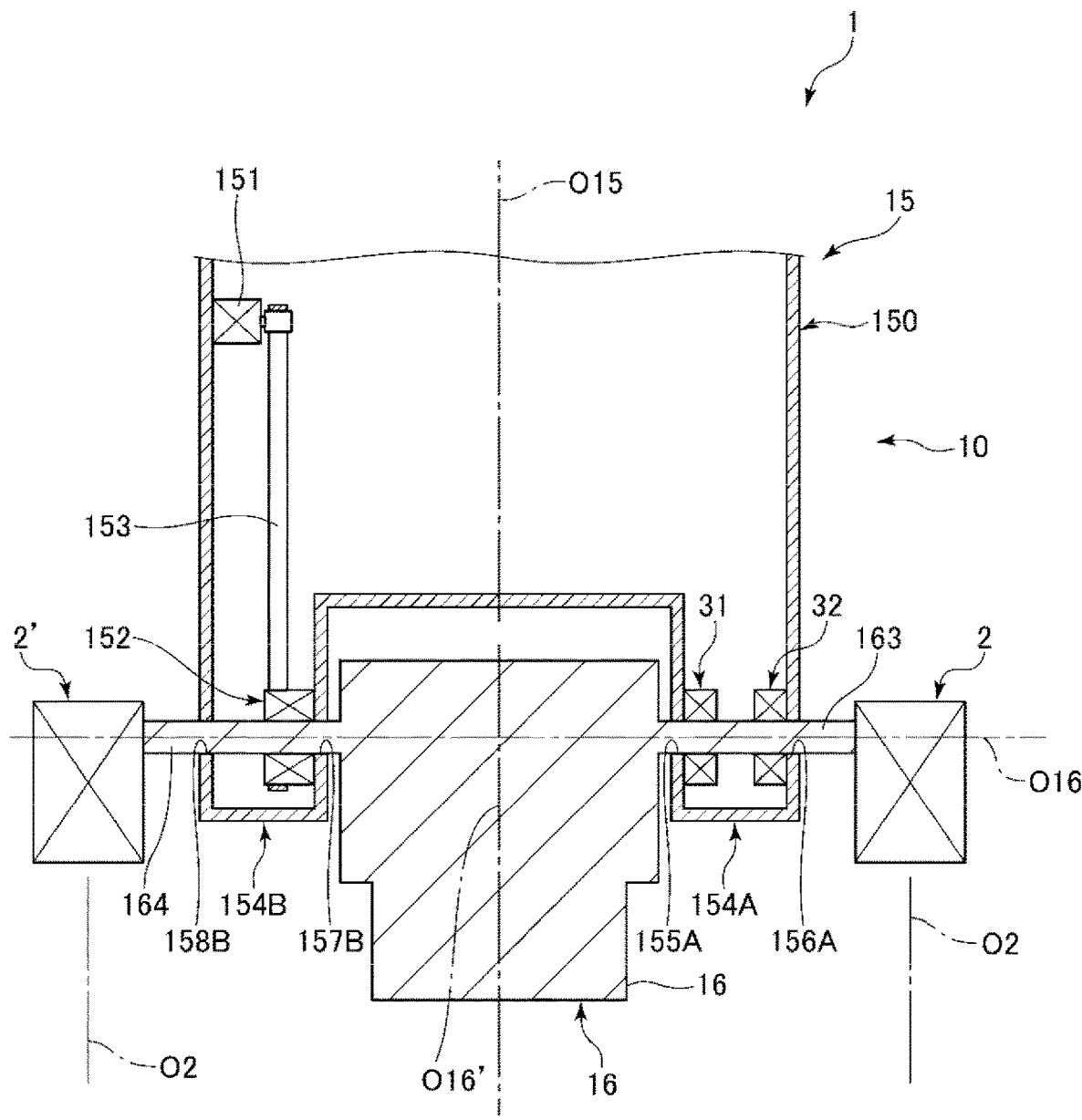
FIG. 4 is a vertical cross-sectional view showing a coupling section between a first arm and a second arm in a robot according to a second embodiment.

As shown in FIG. 4, the robot 1 has a drive section which is provided with a motor, a reduction gear, and so on, and rotates one of the arms 11 through 16 with respect to one of the arms or the base 110 adjacent to that arm. As the motor, there can be used a servomotor such as an AC servomotor or a DC servomotor. Further, the robot 1 has an angular sensor not shown for detecting the rotational angle of a rotary shaft of the motor or the reduction gear. As the angular sensor, there can be used, for example, a rotary encoder. Further, the drive section and the angular sensor are provided to, for example, each of the arms 11 through 16, and in the present embodiment, the robot 1 has six drive sections and six angular sensors. Further, each of the drive sections is electrically coupled to the control device 5 via a motor driver not shown and incorporated in, for example, the robot 1. Further, each of the angular sensors is also electrically coupled to the control device 5.

In such a robot 1, there is set a base coordinate system (a robot coordinate system) with reference to the base 110 of the robot 1. The base coordinate system is a three-dimensional Cartesian coordinate system defined by a first axis and a second axis each parallel to a horizontal direction, and a third axis which is perpendicular to the horizontal direction, and at the same time, the positive direction of which is a vertically upward direction. Further, in the robot 1, there is set a tip coordinate system taking the control point described above as the origin. The tip coordinate system is a three-dimensional Cartesian coordinate system defined by three axes perpendicular to each other. Further, in the present embodiment, the calibration between the base coordinate system described above and the tip coordinate system has been completed, and there is established the state in which the coordinate in the tip coordinate system can be calculated from the coordinate in the base coordinate system.

As shown in FIG. 1 through FIG. 3, the imaging section 2 is a sensor for detecting an object as an image, and is installed in the arm 16 in the robot arm 10. Further, the imaging section 2 rotates with respect to the arm 15 in tandem with the arm 16 as described later, and therefore takes an image in the direction to which the tip of the hand 17 faces. Further, the imaging section 2 is disposed so that the optical axis O2 becomes parallel to the central axis O16' of the arm 16. Therefore, it is possible to take an image in the direction to which the tip of the arm 16 faces, namely the direction to which the hand 17 faces. Further, imaging is performed in the imaging field in which the detection range, namely the imaging area, of the imaging section 2 includes the tip of the hand 17.

The imaging section 2 has an imaging element 21 formed of a CCD (Charge Coupled Device) having a plurality of pixels, and an optical system not shown including a lens and so on. The imaging section 2 images the light from the imaging target and so on with the lens on the light receiving surface of the imaging element 21 to thereby convert the light into an electric signal, and then outputs the electric signal to the control device 5. It should be noted that the imaging element 21 is not limited to the configuration described above, but can also be other configurations providing the configurations have an imaging function. It should be noted that the "target" means an obstacle such as a work, a tool, or other objects.

The control device 5 shown in FIG. 1 has a function of controlling the drive of the robot 1, and is coupled to the robot 1 and the imaging section 2 so as to communicate with each other. It should be noted that the control device 5 is coupled to the robot 1 and the imaging section 2 with wire or wirelessly. Further, to the control device 5, there are coupled a display device provided with a monitor not shown, an input device formed of, for example, a keyboard, and so on.

The control device 5 includes a control section 51 provided with a processor, a storage section 52 provided with a memory and so on, and an external input/output section 53 provided with an external interface. The constituents of the control device 5 are coupled via a bus so as to be able to communicate with each other.

The control section 51 is provided with the processor such as a CPU (Central Processing Unit) to execute a variety of programs and so on stored in the storage section 52. Thus, it is possible to realize a process such as the control of the drive of the robot 1, a variety of arithmetic operations and determinations.

In the storage section 52, there are saved a variety of programs which can be executed by the controls section 51. Further, in the storage section 52, there can be saved a variety of types of data received in the external input/output section 53. The storage section 52 is configured including a volatile memory such as a RAM (Random Access Memory), a nonvolatile memory such as a ROM (Read Only Memory), and so on.

It should be noted that the storage section 52 is not limited to the configuration having a non-detachable type external storage device, but can also be a configuration having a detachable type external storage device not shown. Further, it is also possible for the storage section 52 to be installed in a different place via a network such as LAN (Local Area Network).

As the variety of programs, there can be cited a program for driving the robot 1 based on information obtained by the imaging section 2, and so on. Thus, it is possible to drive the robot 1 based on the image obtained by the imaging section 2, and thus it is possible to accurately perform the operation.

The external input/output section 53 is provided with the external interface, and is used for coupling the robot 1, the imaging section 2, the display device, and the input device to each other. Further, the external input/output section 53 functions as a "reception section" for receiving information related to the image from the imaging section 2.

Although not shown in the drawings, such a control device 5 can be configured including, for example, a controller coupled to the robot 1 so as to be able to communicate with each other, and a computer coupled to the controller so as to be able to communicate with each other.

It should be noted that the control device 5 can also be added with still another configuration in addition to the configuration described above. Further, the variety of programs, data, and so on stored in the storage section 52 can be those stored in advance in the storage section 52, or can also be those stored in a recording medium not shown such as a CD-ROM and then provided from the recording medium, or can also be those provided via a network.

Hereinabove, a basic configuration of the robotic system 100 is described.

Then, the arm 15, the arm 16, and a coupling region therebetween will be described in detail.

As shown in FIG. 3, the arm 15 has a housing 150, and a motor 151 and a reduction gear 152 as a hollow device installed in the housing 150. An output shaft of the motor 151 and an input section of the reduction gear 152 are coupled to each other via an endless belt 153, the rotational force of the motor 151 is transmitted to the reduction gear 152, and thus reduction in speed can be achieved.

On the other hand, as described later, in the arm 16, the base end part is provided with a protruding part 162 and an attachment member 163 protruding in respective directions opposite to each other. Due to the rotational force reduced in speed by the reduction gear 152, the arm 16 rotates around the rotational axis O16 with respect to the arm 15.

It should be noted that the housing 150 is a hollow member in the illustrated configuration, but this is not a limitation, and the housing 150 is not required to be the hollow member except a part where the endless belt 153 is installed.

The housing 150 has an elongated shape extending along the central axis O15 as a first axis. Further, in the tip part of the housing 150, there are disposed a pair of support sections 154A, 154B extending along a direction parallel to the central axis O15. Further, the support section 154A and the support section 154B are disposed in this order from the right side in FIG. 3. The support section 154A and the support section 154B each have a flat shape defining a direction perpendicular to the central axis O15 as the thickness direction.

The support section 154A has a through hole 155A as a penetrating hole inside, namely in a wall part on the near side to the central axis O15. Further, the support section 154A has a through hole 156A as a penetrating hole outside, namely in a wall part on the far side from the central axis O15. The through hole 155A and the through hole 156A are disposed at positions centered on the rotational axis O16 described later. Through the through hole 155A and the through hole 156A, there is inserted the attachment member 163 described later.

Further, in the inner surface of the wall part provided with the through hole 155A, there is installed a bearing 31 having a hollow part, and in the inner surface of the wall part provided with the through hole 156A, there is installed a bearing 32 having a hollow part. As the bearing 31 and the bearing 33, it is possible to use, for example, a ball bearing having an inner ring, an outer ring, and balls disposed therebetween. The inner ring is fixed to the outer circumferential part of the attachment member 163, and the outer ring is fixed to the support section 154A.

Since holes provided to the arm 15 are the through hole 155A and the through hole 156A provided to the support section 154A, it is possible to make the attachment member 163 protrude to the outside of the arm 15, and it is possible to dispose the imaging section 2 outside the outer surface of the arm 15 as described later.

The support section 154B has a through hole 157B as a penetrating hole inside, namely in a wall part on the near side to the central axis O15. Further, in the wall part provided with the through hole 157B, there is installed the reduction gear 152. Through the reduction gear 152, there is inserted the protruding part 162 of the arm 16. The reduction gear 152 can be provided with, for example, a configuration having an inner ring and an outer ring as described above. The reduction gear 152 is capable of reducing the rotational speed of the input side to set the rotational speed of the output side, and has the input side as the outer ring, and the output side as the inner ring. The inner ring is fixed to the protruding part 162, and the outer ring is fixed to the housing 150. As the reduction gear 152, there can be used, for example, a planetary gear-type reduction gear or a wave gear device.

As described above, the arm 15 as the first arm has the support section 154A and the support section 154B protruding in the axial direction of the central axis O15 as the first axis to support the arm 16 as the second arm. Thus, when the arm 16 rotates, it is possible sufficiently ensure the rotational range of the arm 16 while preventing the arm 15 and the arm 16 from interfering with each other.

Then, the arm 16 will be described.

As shown in FIG. 3, the arm 16 is disposed between the support section 154A and the support section 154B, and is supported by the support section 154A and the support section 154B so as to be able to rotate around the rotational axis O16. The rotational axis O16 is an axis in a direction crossing, in particular perpendicular to, the central axis O15 of the arm 15.

Further, the arm 16 is supported by the arm 15 so as to be able to rotate around the rotational axis O16 as the second axis. The rotational axis O16 is an axis extending in the direction perpendicular to the central axis O16' as described above. Further, the arm 16 has an arm main body 161 shaped like a circular cylinder, and the protruding part 162 disposed so as to protrude from a side surface of the arm main body 161.

The protruding part 162 has a circular cylindrical shape, and extends along the rotational axis O16. Further, the protruding part 162 is inserted through the through hole 157B of the support section 154B, and is fixed to the reduction gear 152 at the same time. Thus, the rotational force of the output of the reduction gear 152 is transferred to the arm 16 via the protruding part 162.

Further, on the opposite side via the central axis O16' to the protruding part 162, there is disposed the attachment member 163. The attachment member 163 is formed integrally with the arm 16 in the present embodiment, but is not limited to this configuration, and can also be formed as a separate member. Further, the attachment member 163 is shaped like a round bar extending along the rotational axis O16. The attachment member 163 is inserted through the through hole 155A and the through hole 156A, and an end part of the attachment member 163 is exposed outside the arm 15. Further, the attachment member 163 is rotatably supported in the middle by the bearing 31 and the bearing 32. Due to such a configuration, the arm 16 is rotatably supported on both sides by the support section 154A and the support section 154B of the arm 15.

Further, to the end part exposed outside the arm 15 of the attachment member 163, there is fixed the imaging section 2. The imaging section 2 is disposed so that the optical axis O2 thereof becomes parallel to the central axis O16' of the arm 16. It should be noted that this is not a limitation, and the optical axis O2 and the central axis O16' are not required to be parallel to each other. Further, the imaging section 2 is located outside the arm 16 apart from the arm 16.

Here, in the present disclosure, since the imaging section 2 is supported by the attachment member 163 fixed to the arm 16 as the second arm, the imaging section 2 also rotates integrally therewith due to the rotation of the arm 16 as much as the same rotational amount. Further, since the attachment member 163 extends along the rotational axis O16, the state in which the optical axis O2 of the imaging section 2 and the rotational axis O16 of the arm 16 are parallel to each other is kept even when the arm 16 rotates. Thus, it is possible for the imaging section 2 to always image the tip side of the arm 16, namely the tip of the hand 17 located on the tip side of the arm 16, irrespective of the posture of the arm 16. Therefore, it is possible to prevent such a problem that the hand 17 runs off the imaging field of the imaging section 2 as in the related art, and thus, the operation of the robot 1 is smoothly and accurately performed.

Further, the attachment member 163 is inserted through the through hole 155A and the through hole 156A, namely inside the arm 15, and extends to the outside of the arm 15. Thus, it is possible to prevent the attachment member 163 from interfering with the arm 15 due to the rotation of the arm 16. Therefore, it is possible to sufficiently ensure the rotational range, namely the movable range, of the arm 15.

Further, the end part to which the imaging section 2 is attached of the attachment member 163 is located outside the arm 15. Therefore, the imaging section 2 as a sensor is located outside the outside surface of the arm 15 as the first arm. Thus, it is possible to sufficiently ensure the separation distance between the optical axis O2 and the central axis O16' of the arm 16. Therefore, corresponding to the separation, it is possible to prevent the arm 16 from showing up in the imaging field of the imaging section 2, and it is possible to more surely make the hand 17 fall within the imaging field of the imaging section 2.

As described hereinabove, the robot 1 is provided with the arm 15 as the first arm having the through hole 155A and the through hole 156A as the holes, and extending along the central axis O15 as the first axis, the arm 16 as the second arm coupled to the arm 15, and rotating around the rotational axis O16 as the second axis crossing the central axis O15, the imaging section 2 as a sensor for detecting the target, and the attachment member 163 provided to the arm 16, and supporting the imaging section 2. Further, the attachment member 163 is inserted through the through hole 155A and the through hole 156A, and extends along the rotational axis O16. Thus, the arm 16 and the imaging section 2 rotate around the rotational axis O16 in tandem with each other. As a result, it is possible for the imaging section 2 to always image the tip side of the arm 16, namely the tip of the hand 17 located on the tip side of the arm 16, irrespective of the posture of the arm 16.

Further, the sensor supported by the attachment member 163 is the imaging section 2 as a camera. Thus, it is possible to image the tip side of the hand 17 to figure out the tip side of the hand 17 as an image, and it is possible to use the imaging result for, for example, the control of the robot 1.

It should be noted that it is also possible to form the protruding part 162 and the attachment member 163 to have a hollow cylindrical shape, and dispose a hollow part in the arm main body 161. In this case, it is possible to lay around the interconnections of the imaging section 2 to the inside of the arm 15 via the hollow part in the attachment member 163, the hollow part in the arm main body 161, and the hollow part in the protruding part 162 in this order. Therefore, the part where the interconnections of the imaging section 2 are exposed outside the interconnections of the arm 15 can be reduced as much as possible, and thus, it is possible to prevent or inhibit broking of the interconnections.

Further, although in the present embodiment, there is described when the sensor is the imaging section 2, this is not a limitation in the present disclosure, and the sensor can also be a ranging sensor. Thus, it is possible to detect the distance from the target such as a work, a tool, or an obstacle in the detection range to control the operation of the robot 1 based on the detection result. Therefore, it is possible to more accurately perform the operation with a simple and easy configuration. It should be noted that as the ranging sensor, it is possible to use a sensor such as an ultrasonic sensor or an optical sensor using a laser beam, infrared light, or the like.

Further, although in the present embodiment, there is described when the first arm is the arm 15, and the second arm is the arm 16 as an example, this is not a limitation in the present disclosure, and it is also possible to set the arm 11 as the first arm and the arm 12 as the second arm, it is also possible to set the arm 12 as the first arm and the arm 13 as the second arm, it is also possible to set the arm 13 as the first arm and the arm 14 as the second arm, and it is also possible to set the arm 14 as the first arm and the arm 15 as the second arm.

Second Embodiment

Then, a second embodiment will be described.

FIG. 4 is a vertical cross-sectional view showing a coupling section between the first arm and the second arm in a robot according to the second embodiment.

The present embodiment is substantially the same as the first embodiment described above except mainly the point that the configuration of the coupling section between the first arm and the second arm is different. It should be noted that in the following description, the description will be presented with a focus on the difference from the first embodiment described above, and the description of substantially the same issues will be omitted.

As shown in FIG. 4, in the present embodiment, the support section 154B is provided with a through hole 158B as a hole disposed in the wall part on the opposite side to the arm 16 in addition to the through hole 157B as the hole. The through hole 157B and the through hole 158B are concentrically disposed centered on a straight line including the rotational axis O16.

Further, the arm 16 further has an attachment member 164 in addition to the attachment member 163. The attachment member 163 and the attachment member 164 are concentrically disposed centered on the straight line including the rotational axis O16 on the sides opposite to each other via the central axis O16' of the arm 16. Further, the attachment member 164 is inserted through the through hole 157B, the hollow part of the reduction gear 152, and the through hole 158B, and is fixed to the inner ring of the reduction gear 152 in the middle thereof in the longitudinal direction.

Further, an end part of the attachment member 164 is disposed so as to protrude from the through hole 158B, and is attached with an imaging section 2'. In other words, in the present embodiment, there are installed the imaging section 2 and the imaging section 2' as two sensors. Further, although not shown in the drawings, the imaging section 2 and the imaging section 2' are electrically coupled to the control device 5, and the images obtained by the imaging section 2 and the imaging section 2' are transmitted to the control device 5. Further, it is possible for the control device 5 to control the operation of the robot 1 based on these images.

As described above, the support section 154A and the support section 154B are disposed via the central axis O15, namely on both sides of the arm 16. In other words, the arm 15 as the first arm has the two support sections, namely the support section 154A and the support section 154B, and the arm 16 as the second arm is disposed between the support section 154A and the support section 154B. Thus, as described above, it is possible to install the imaging section 2 and the imaging section 2' as the two sensors. Further, since these imaging sections function as a stereo camera, it is possible to also detect the distance from the target.

It should be noted that the configuration described above is not a limitation, and as the sensors respectively supported by the attachment member 163 and the attachment member 164, it is possible to adopt a combination of the imaging section and the ranging sensor described in the first embodiment described above, or to adopt two ranging sensors. Further, when adopting the two ranging sensors, it is possible to adopt a combination of the types different from each other, or to adopt a combination of the same type.

Third Embodiment

Then, a third embodiment will be described.

Figure 5:
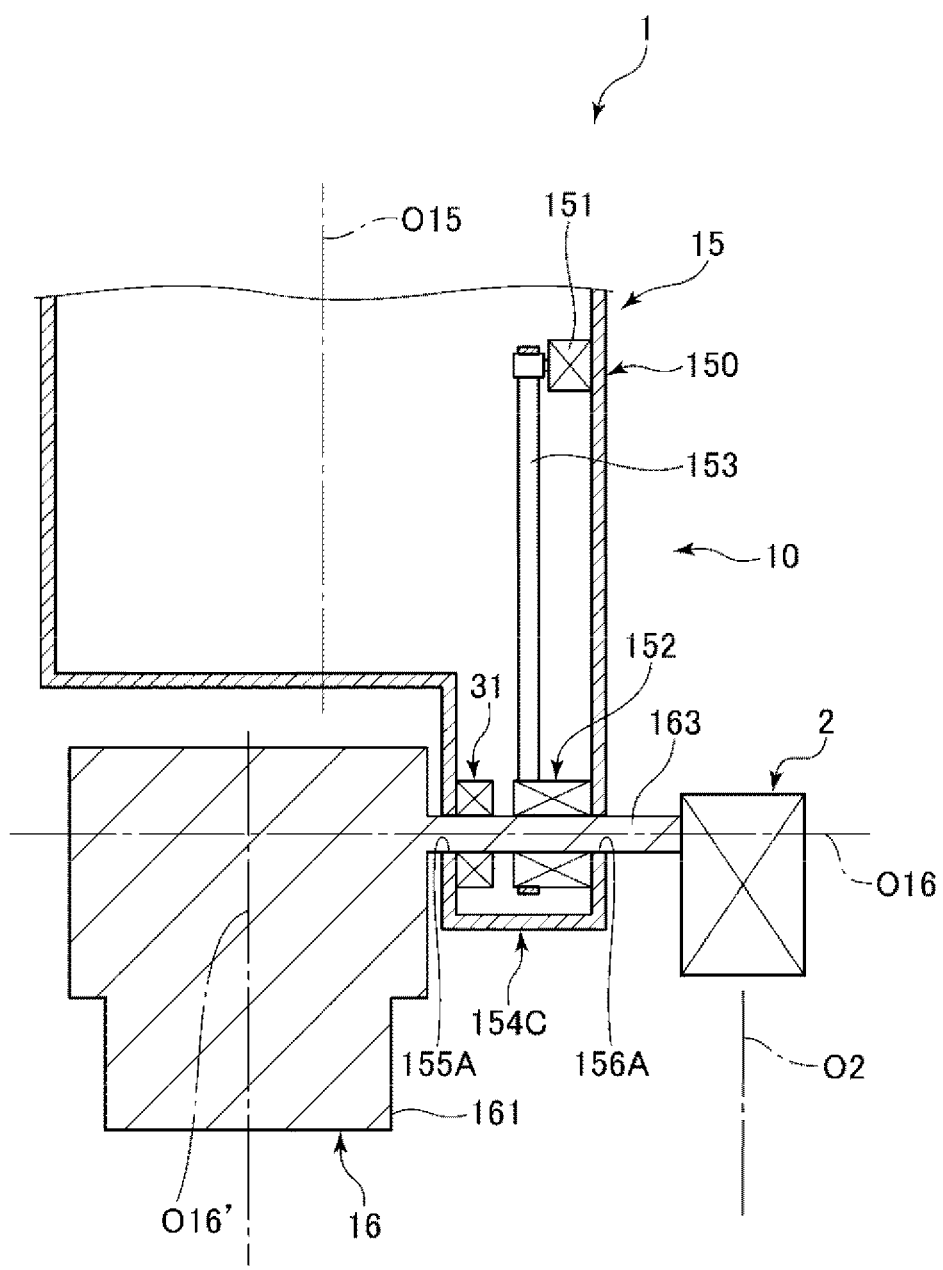
FIG. 5 is a vertical cross-sectional view showing a coupling section between a first arm and a second arm in a robot according to a third embodiment.

FIG. 5 is a vertical cross-sectional view showing a coupling section between the first arm and the second arm in a robot according to the third embodiment.

The present embodiment is substantially the same as the first embodiment described above except mainly the point that the configuration of the coupling section between the first arm and the second arm is different. It should be noted that in the following description, the description will be presented with a focus on the difference from the first embodiment described above, and the description of substantially the same issues will be omitted.

As shown in FIG. 5, in the present embodiment, the support section 154B shown in FIG. 3 is omitted, and there is provided a support section 154C corresponding to the support section 154A. The support section 154C has the through hole 155A and the through hole 156A. On the inner surface of the wall part provided with the through hole 155A, there is fixed the outer ring of the bearing 31. Further, the inner surface of the wall part provided with the through hole 156A, there is fixed the outer ring of the reduction gear 152. Further, in the present embodiment, the motor 151 and the endless belt 153 are disposed on the reduction gear 152 side, namely on the support section 154A side.

As described above, in the present embodiment, the arm 16 is cantilevered by the arm 15. Thus, since the support section 154B shown in FIG. 3 is omitted, it is possible to achieve reduction in diameter and reduction in weight of the arm 16, accordingly.

Fourth Embodiment

Then, a fourth embodiment will be described.

Figure 6:
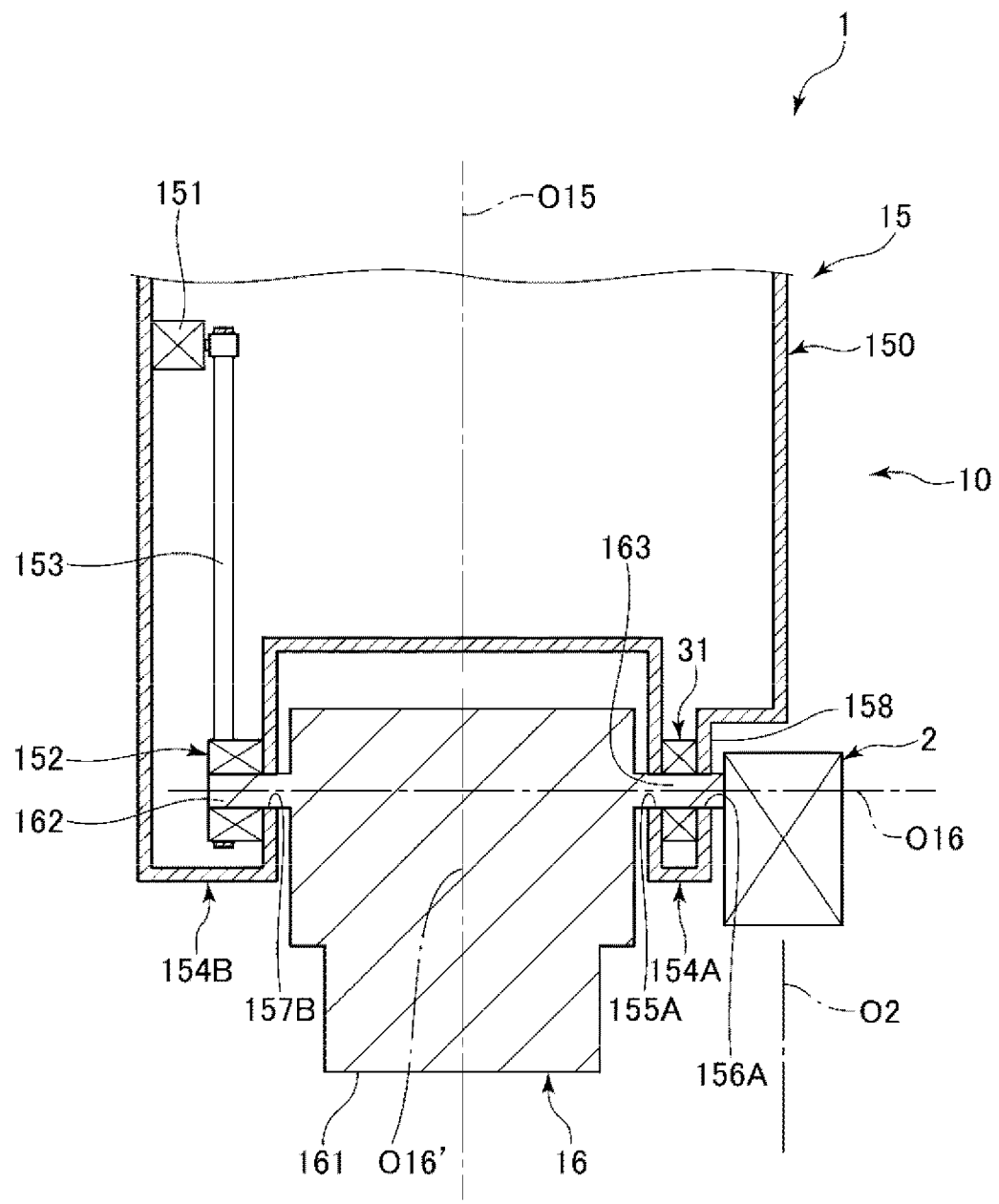
FIG. 6 is a vertical cross-sectional view showing a coupling section between a first arm and a second arm in a robot according to a fourth embodiment.

FIG. 6 is a vertical cross-sectional view showing a coupling section between the first arm and the second arm in a robot according to the fourth embodiment.

The present embodiment is substantially the same as the first embodiment described above except mainly the point that the configuration of the coupling section between the first arm and the second arm is different. It should be noted that in the following description, the description will be presented with a focus on the difference from the first embodiment described above, and the description of substantially the same issues will be omitted.

As shown in FIG. 6, in the present embodiment, the arm 15 has a recessed part 158 where the imaging section 2 is disposed. The recessed part 158 is formed of a hollow provided to a part facing the imaging section 2 of the support section 154A. Further, the recessed part 158 opens on the lateral side and the tip side of the arm 15. It should be noted that in the present embodiment, since the recessed part 158 is formed, the bearing 32 shown in FIG. 3 is omitted, accordingly. Further, since the recessed part 158 is formed, it is possible to make the length of the attachment member 163 shorter than that in the configuration shown in FIG. 3, accordingly.

As described above, the arm 16 as the first arm has the recessed part 158 which is disposed at a position facing the imaging section 2 as the sensor, and in which the imaging section 2 is disposed. Thus, it is possible to reduce the part where the imaging section 2 protrudes from the outer surface of the arm 15, and therefore, it is possible to make it difficult for the imaging section 2 to interfere with other structures. Further, by controlling the depth of the recessed part 158, it is possible to adjust the distance between the optical axis O2 and the central axis O16'.

Fifth Embodiment

Then, a fifth embodiment will be described.

Figure 7:
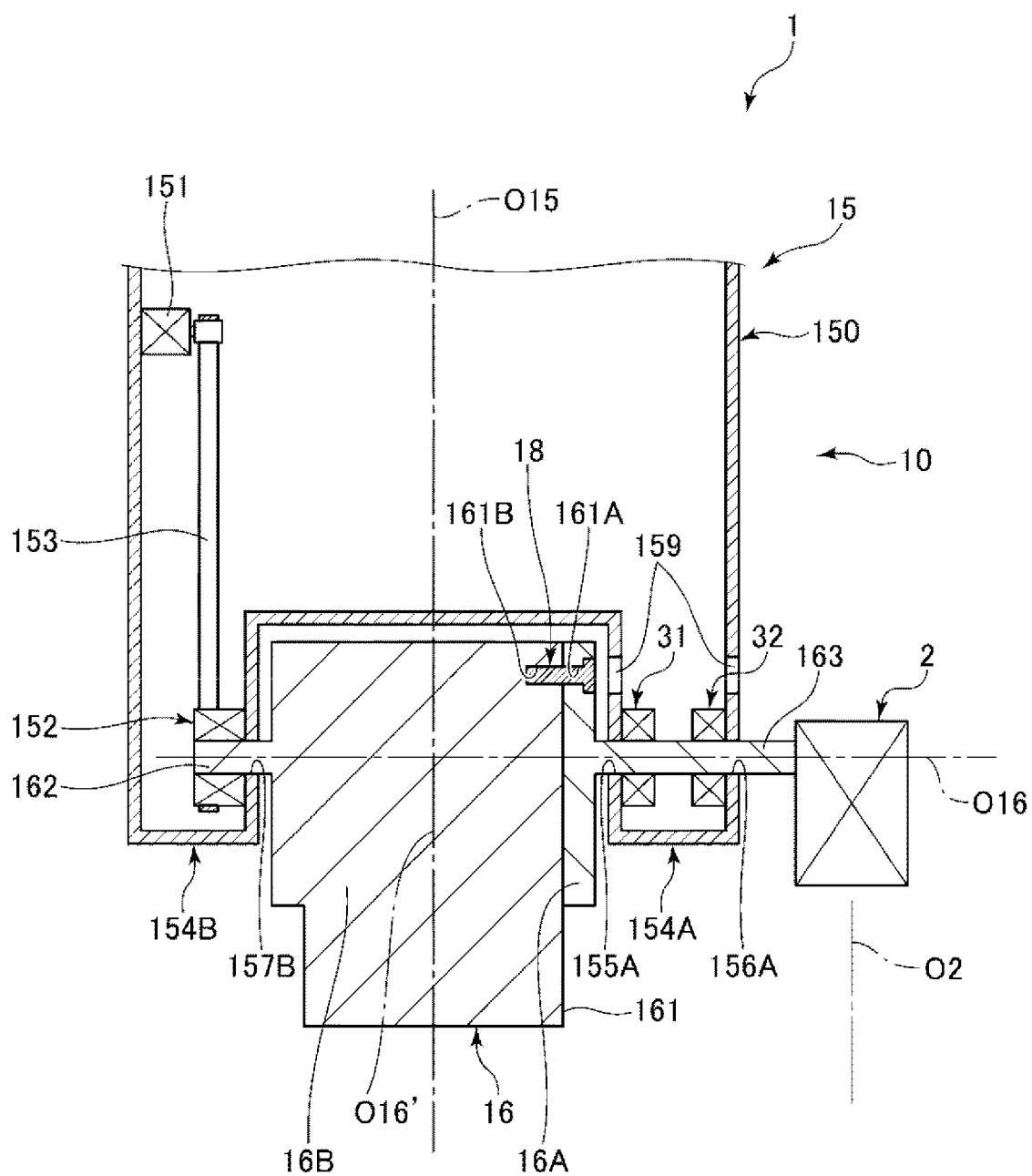
FIG. 7 is a vertical cross-sectional view showing a coupling section between a first arm and a second arm in a robot according to a fifth embodiment.
Figure 8:
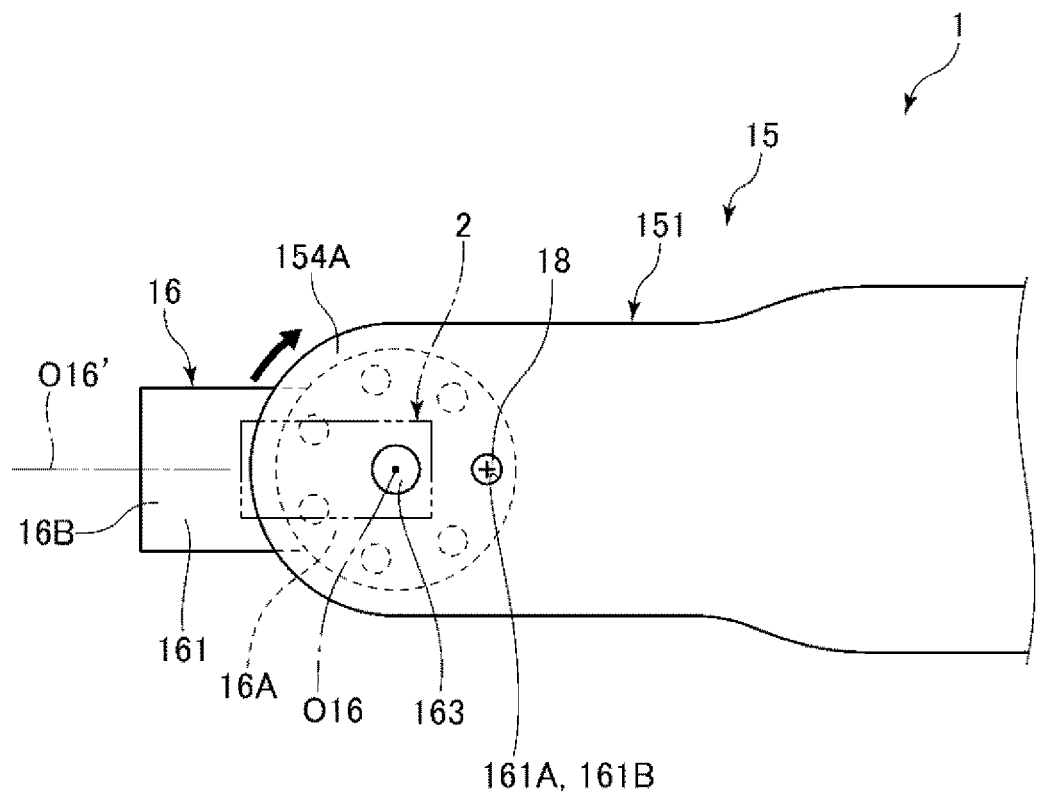
FIG. 8 is a side view of the coupling section between the first arm and the second arm shown in FIG. 7.

FIG. 7 is a vertical cross-sectional view showing a coupling section between the first arm and the second arm in a robot according to the fifth embodiment. FIG. 8 is a side view of the coupling section between the first arm and the second arm shown in FIG. 7.

The present embodiment is substantially the same as the first embodiment described above except mainly the point that the configuration of the coupling section between the first arm and the second arm is different. It should be noted that in the following description, the description will be presented with a focus on the difference from the first embodiment described above, and the description of substantially the same issues will be omitted.

As shown in FIG. 7, in the present embodiment, the arm 16 is divided along a plane including the central axis O16', and is formed of an assembly constituted by a first member 16A and a second member 16B as separate members. Further, the first member 16A and the second member 16B can be fixed to each other with screws 18, and can be split by removing the screws 18. The first member 16A has a block-like shape having the attachment member 163. Further, the second member 16B has a block-like shape having the protruding part 162.

Further, the first member 16A has screw holes 161A. The screw holes 161A are each formed of a through hole extending in a direction parallel to the rotational axis O16 to penetrate the first member 16A. The second member 16B has screw holes 161B each opening at a position facing the first member 16A, and extending in a direction parallel to the rotational axis O16. The screw hole 161A and the screw hole 161B are communicated with each other, and the screw 18 is inserted therethrough in a lump. Thus, the first member 16A and the second member 16B are fixed to each other. Further, as shown in FIG. 8, there are disposed a plurality of the screw holes 161A and a plurality of the screw holes 161B around the rotational axis O16.

Further, as shown in FIG. 7 and FIG. 8, the support section 154A is provided with a pair of tool insertion holes 159. The tool insertion holes 159 are the parts through which a tool such as a screw driver used when turning the screw 18 is inserted. The pair of tool insertion holes 159 are respectively disposed in the wall part on the central axis O16' side and the wall part on the opposite side to the central axis O16' with respect to the support section 154A. Further, the pair of tool insertion holes 159 overlap each other in a plan view of the opening surfaces thereof. By providing such tool insertion holes 159, it is possible to insert the tool to screw the screw 18 into the screw hole 161A and the screw hole 161B.

Further, by performing the screw clamp while rotating the arm 16 in the arrow direction in FIG. 8, namely by performing the screw clamp while rotating the arm 16 to change the positions of the screw hole 161A and the screw hole 161B, it is possible to screw the screw 18 into each of the screw holes 161A and each of the screw holes 161B.

Sixth Embodiment

Then, a sixth embodiment will be described.

Figure 9:
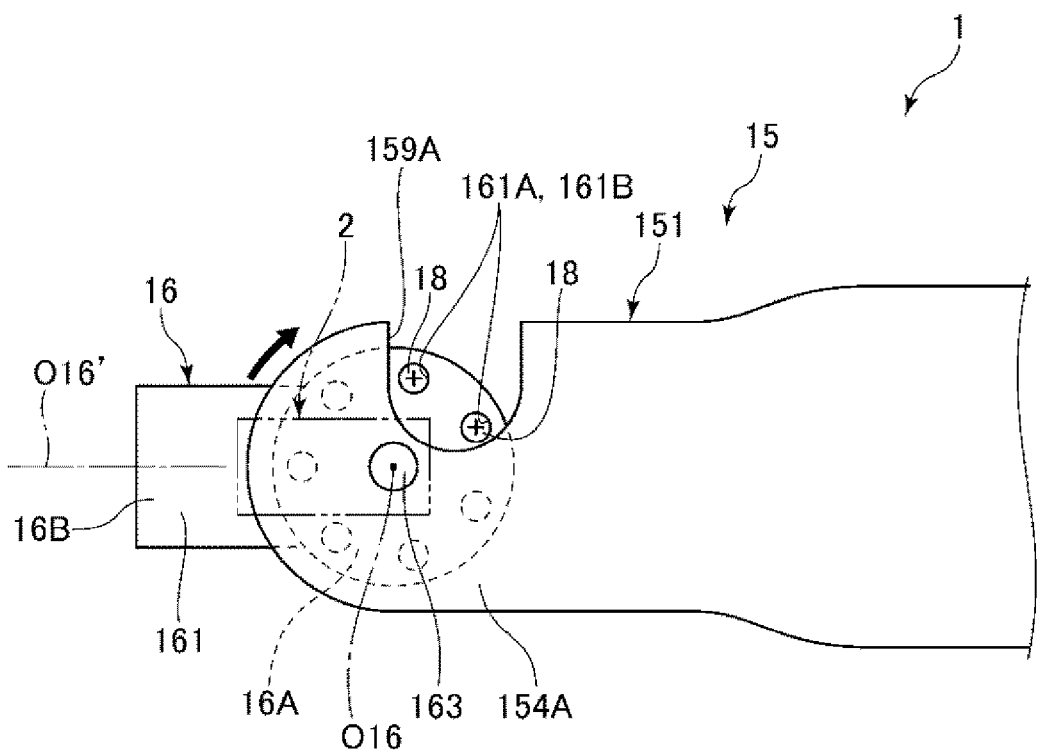
FIG. 9 is a side view showing a coupling section between a first arm and a second arm in a robot according to a sixth embodiment.

FIG. 9 is a side view showing a coupling section between the first arm and the second arm in a robot according to the sixth embodiment.

The present embodiment is substantially the same as the first embodiment described above except mainly the point that the configuration of the coupling section between the first arm and the second arm is different. It should be noted that in the following description, the description will be presented with a focus on the difference from the fifth embodiment described above, and the description of substantially the same issues will be omitted.

As shown in FIG. 9, in the present embodiment, the support section 154A of the arm 15 has a cutout 159A. The cutout 159A is formed so as to penetrate the support section 154A in a direction along the rotational axis O16. Further, the cutout 159A opens on the lateral side of the support section 154A. According to such a present embodiment, it is possible to insert the tool via the cutout 159A to screw the screw 18 into the screw hole 161A and the screw hole 161B.

Further, by performing the screw clamp while rotating the arm 16 in the arrow direction in FIG. 9, namely by performing the screw clamp while rotating the arm 16 to change the positions of the screw hole 161A and the screw hole 161B, it is possible to screw the screw 18 into each of the screw holes 161A and each of the screw holes 161B.

Although the robot according to the present disclosure is described hereinabove based on the illustrated embodiments, the present disclosure is not limited to the embodiments, but the configuration of each of the sections can be replaced with one having substantially the same function and an arbitrary configuration. Further, it is also possible to add any other constituents to the present disclosure. Further, it is also possible to arbitrarily combine any of the embodiments with each other.

Further, although in the embodiments described above, a so-called six-axis vertical articulated robot is illustrated as the robot according to the present disclosure, the robot can be other robots such as a scalar robot. Further, the embodiment is not limited to a single-arm robot, but can also be another robot such as a dual-arm robot. Further, the number of the arms provided to the robot arm is six in the embodiment described above, but can also be one through five, or seven or more.

Further, the hole provided to the first arm is formed of a through hole in the embodiment described above, but is not limited to this configuration in the present disclosure, and is not required to be the through hole. Specifically, the hole can also be formed of a hole formed to the middle of the support section. In this case, there is provided a hollow part which is communicated with the hole, and in which the sensor is disposed. Further, the hollow part has a configuration of opening on the tip side. Thus, it is possible for the sensor in the hollow part to detect the target.

What is claimed is:

1. A robot comprising:
a first arm having a through hole and extending along a first axis;
a second arm coupled to the first arm, and rotating around a second axis crossing the first axis;
a sensor configured to detect a target;
an attachment member provided to the second arm, and configured to support the sensor; and
a bearing provided around the through hole in the first arm, and configured to support the attachment member, wherein
the attachment member is inserted through the through hole in the first arm, extending along the second axis, and rotating around the second axis in tandem with the rotation of the second arm.

2. The robot according to claim 1, wherein
the sensor is located outside an outer surface of the first arm.

3. The robot according to claim 1, wherein
the first arm has a support section protruding along an axial direction of the first axis to support the second arm.

4. The robot according to claim 3, wherein
the first arm has the two support sections, and
the second arm is disposed between the two support sections.

5. The robot according to claim 3, wherein
the through hole is provided to the support section.

6. The robot according to claim 1, wherein
the first arm has a recessed part in which the sensor is disposed.

7. The robot according to claim 1, wherein
the sensor is a ranging sensor.

8. The robot according to claim 1, wherein
the sensor is a camera.

* * * * *